United States Patent
Cohen et al.

(10) Patent No.: US 8,589,999 B1
(45) Date of Patent: Nov. 19, 2013

(54) METHODS AND SYSTEMS FOR SPLICING BETWEEN MEDIA STREAMS

(75) Inventors: Adam Cohen, Ramat Gan (IL); Alon Shafrir, Kfar Saba (IL); Edward Stein, Tel Aviv (IL)

(73) Assignee: ARRIS Solutions, Inc., Suwanee, GA (US)

( * ) Notice: Subject to any disclaimer, the term of this patent is extended or adjusted under 35 U.S.C. 154(b) by 547 days.

(21) Appl. No.: 12/853,325

(22) Filed: Aug. 10, 2010

Related U.S. Application Data

(60) Provisional application No. 61/232,809, filed on Aug. 11, 2009.

(51) Int. Cl.
  *H04N 7/173* (2011.01)
  *H04N 11/02* (2006.01)
  *H04N 7/26* (2006.01)
  *G06K 9/36* (2006.01)

(52) U.S. Cl.
  USPC ............... 725/131; 375/240.25; 348/410

(58) Field of Classification Search
  USPC ......... 375/240.25, 240.03; 348/410, 410.1, 348/397.1, 398.1; 382/233; 725/131
  See application file for complete search history.

(56) References Cited

U.S. PATENT DOCUMENTS

| | | | |
|---|---|---|---|
| 6,445,738 B1 * | 9/2002 | Zdepski et al. | 375/240.01 |
| 6,721,710 B1 | 4/2004 | Lueck et al. | |
| 6,763,522 B1 * | 7/2004 | Kondo et al. | 725/39 |
| 2007/0291847 A1 * | 12/2007 | Shimauchi et al. | 375/240.16 |
| 2010/0020866 A1 * | 1/2010 | Marpe et al. | 375/240.02 |
| 2010/0142836 A1 * | 6/2010 | Joshi et al. | 382/233 |
| 2011/0103445 A1 * | 5/2011 | Jax et al. | 375/224 |

* cited by examiner

*Primary Examiner* — Pankaj Kumar
*Assistant Examiner* — Reuben M Brown
(74) *Attorney, Agent, or Firm* — Troy A. Van Aacken

(57) ABSTRACT

A media processing unit, the media processing unit including: (i) an input interface, configured to receive a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; (ii) a media-processor, configured to select a selected access unit of the second media stream, and to process the second media stream to provide a processed second media stream by writing into the selected access unit decoding parameters that are responsive to decoding parameters of a previous first access unit; and (iii) a transmitter, configured to transmit the processed second media stream to a splicer.

28 Claims, 8 Drawing Sheets

| 610 receiving a second media stream, wherein the second media stream includes first access units that include decoding parameters, and second access units of which each second access unit does not include decoding parameters sufficient for full decoding of that second access unit |

| 620 selecting an access unit of the second media stream. |

| 630 processing the second media stream to provide a processed second media stream |
| 632 writing into the selected access unit of the second media stream decoding parameters that are responsive to the decoding parameters of at least one previous first access unit |

| 640 transmitting the processed second media stream to a splicer. |

| 650 splicing from a first media stream to the processed media stream, wherein the splicing may be carried out in response to the decoding parameters written into the selected access unit of the processed second media stream. |

| 660 transmitting a splicer output stream that includes at least a portion of the processed second media stream (and may conveniently include the portion that starts in the selected access unit) toward end-user equipment |

| 670 displaying the splicer output stream that includes the at least portion of the processed second media stream on a display of the end-user equipment or on a display connected to the end-user equipment. |

METHODS AND SYSTEMS FOR SPLICING BETWEEN MEDIA STREAMS

RELATED APPLICATIONS

This application claims priority from U.S. provisional patent application Ser. No. 61/232,809 filing date Aug. 11, 2009 which is incorporated herein by its entirety.

BACKGROUND OF THE INVENTION

In modern media transmissions, many a time splicing of media streams is required, in which a transmitter that transmits one media stream splices into transmission of another media stream, wherein that transition is required to be as smooth and unnoticeable for a viewer/receiver as possible. By way of example, in television or digital radio broadcasting, advertisements may be inserted into a transmission of another program, wherein the transitions from the program to advertisement, between different advertisements, and back to the transmission of the program should desirably be as seamless as possible. This difficult task is even more difficult in system that implement multicasting and/or unicasting, such as system that implement targeted advertising in which different viewers/listeners receive different advertisement.

In prior art legal splicing between media stream, if stream B is being concatenated to stream A, the decoder must have all the required information to decode stream B upon transition—at the splice point. It is noted that the required information may pertain to different aspects of transmission if implemented, such as video related information, audio related information, and so forth.

For many audio-compression formats (e.g. MPEG audio, Dolby AC3, AAC-LC), any audio access unit (AU) can serve as a legal random access point and includes all required information to immediately start playing the encoded audio. However, the introduction of advanced audio tools e.g. SBR (Spectral Band Replication, ISO/IEC 14496-3:2003/Amd.1) and PS (Parametric Stereo, ISO/IEC 14496-3:2005/Amd.2) has changed this: Some decoding parameters are passed occasionally (in an optional header) and not for every AU. This introduces a new problem of splicing where not every AU is a random access point. Performing a legal splice in the audio domain for such audio formats requires handling a new problem.

Specifically, if the two streams have different decoding parameters (e.g. different advanced audio tools headers), specifying the new set of parameters must appear on the splicing point. Failure to do so will result in invalid decoding of the second audio stream until all parameters are correctly specified. Unfortunately, the second stream doesn't necessarily have these headers on the splice point. In fact the standards don't necessarily specify any requirement on the frequency of sending these headers.

Referring to the example of advertising offered above, it is noted that ads are expected to start with a random access point. Therefore, a splice between two ads should normally result in a legal audio stream since it is expected that upon the start of each ad, headers carrying all decoding parameters will appear prior to the data in order to allow decoding. In such a situation, a problem may still remain in generating a legal splice upon return to primary stream from an ad break. Since the there are no conditions on the repetition of optional headers in the primary, it is likely that there will be no header upon the return point and that the ad and primary decoding parameters will be different.

Another problem rises when splicing encrypted streams. There is no standard or common practice for specifying and synchronizing of audio random access points to transport layers. The existence and contents of optional audio headers are completely unknown when examining streams where the payload is encrypted.

Failure to solve these problems may result in syntax errors, audio high frequency noise and lip sync flaws. It is noted that output stream may become compliant again after appearance of headers specifying all the different parameters. However, the effect of syntax errors on the decoder is unknown.

There is therefore a need for technologies for enabling splicing between media streams wherein some of the media streams includes deciding parameters in only some of its access units.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates a method for media transmission, according to an embodiment of the invention;

Figure 1A:
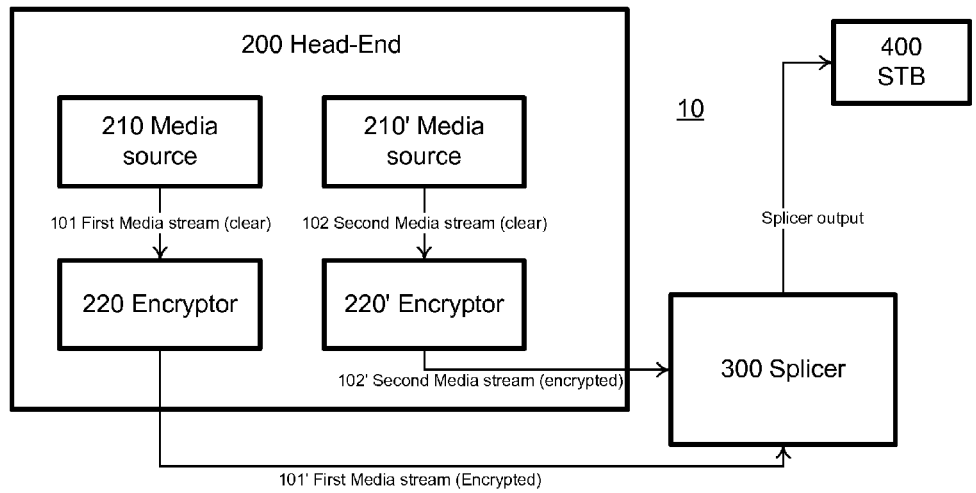
FIGS. 1A and 1B illustrate networks operative for media content transmissions, according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE INVENTION

A media processing unit, the media processing unit including: (i) an input interface, configured to receive a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; (ii) a media-processor, configured to select a selected access unit of the second media stream, and to process the second media stream to provide a processed second media stream by writing into the selected access unit decoding parameters that are responsive to decoding parameters of a previous first access unit; and (iii) a transmitter, configured to transmit the processed second media stream to a splicer.

A method for media transmission, the method including: (i) receiving a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; (ii) selecting an access unit of the second media stream; (iii) processing the second media stream to provide a processed second media stream, wherein the processing includes writing into the selected access unit decoding parameters that are responsive to the decoding parameters of a previous first access unit; and (iv) transmitting the processed second media stream to a splicer.

A splicer, including: (i) an output interface, configured to transmit media streams to another unit; (ii) a media-stream input interface, configured to receive a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; (iii) a processor configured to process the second media stream to provide a processed second media stream in response to decoding-information that pertains to decoding parameters of at least one access unit of the second media stream and that is received from a media-stream monitor that monitors the second media stream; wherein the splicer is configured to splice the transmission of the output interface from transmission of a first media stream into transmission to the other unit of the processed second media stream.

A method for media transmission, the method including carrying out by a splicer: (i) transmitting a first media stream to another unit; (ii) receiving a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; (iii) processing the second media stream to provide a processed second media stream, wherein the processing includes writing into a selected access unit of the second media stream decoding parameters that are responsive to decoding-information that pertains to decoding parameters of at least one access unit of the second media stream and that is received from a media-stream monitor that monitors the second media stream; and (iv) splicing the transmitting into transmitting the processed second media stream to the other unit.

A splicer, including: (i) an output interface, configured to transmit media stream to another unit; and (ii) a media-stream input interface, configured to receive a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; wherein the splicer is configured to splice the transmission of the output interface from transmission of a first media stream into transmission to the other unit of the second media stream; wherein the output interface is further configured to: (a) transmit the second media stream at a first quality from a timing of the splicing until a quality enhancing moment, and (b) transmit the second media stream at a higher quality that is higher than the first quality after the quality enhancing moment.

A method for media transmission, the method including: (i) transmitting a first media stream to another unit; (ii) receiving a second media stream, wherein the second media stream includes first access units and second access units; wherein each second access unit lacks decoding parameters sufficient for full decoding of the second access unit; wherein each first access unit includes decoding parameters required for full decoding of at least one first access unit and of at least one second access unit; and (iii) splicing the transmitting into transmitting the second media stream to the other unit; wherein the transmitting of the second media stream includes: (a) transmitting the second media stream at a first quality from a timing of the splicing until a quality enhancing moment, and (b) transmitting the second media stream at a higher quality that is higher than the first quality after the quality enhancing moment.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The systems and methods disclosed below are related to splicing of media streams (e.g. multimedia transport streams), and may be implemented for various types of media streams such as audio media streams, video media streams, media streams conveying 3D data, and so forth. In some embodiments, those systems and methods may be implemented for concatenation between two different real-time streams, and especially wherein at least one of the real-time streams (to which the splicing is made) does not include decoding parameters in every frame (e.g. Audio frame).

It is noted that the term access unit (AU) relates to units of which the media stream is constructed, such as audio frame, video picture, and so forth. The access units may conveniently be sequential to each other, and would usually not include duplicated data. It is however noted that not all of the access units of the media streams are necessarily of the same size, and in some embodiments of the invention a single media stream may have AUs of variable size.

In some embodiments of the invention, the access units referred to may be the smallest data entity of the media stream to which timing information is attributed, but this is not necessarily so. It is further noted that various embodiments of the invention may be implemented for other sub-structure of the media stream, that include decoding parameters that are not included every such consecutive sub-structure. For example, various media stream may include decoding parameters in packets, in frames, in groups of frames, and so forth. It is further noted that while in various embodiments of the invention, different types of decoding parameters may be included, in at least some of the embodiments the decoding parameters include media decoding parameters required for successful decoding (and presentation) of media content of the media stream.

According to an embodiment of the invention, the proposed invention may be implemented on a primary to ad, ad to primary, or ad to ad transition, where the first audio frame in the stream spliced into is not necessarily a random access point (i.e. is not an access point that includes sufficient decoding parameters for decoding of its content).

For example, the methods and systems introduced below may be used for splicing over advanced audio (AA) tools whose parsing is based on header parameters (e.g. side band replication (SBR) tool, parametric stereo (PS) tool). The techniques disclosed are also applicable for future AA tools whose parsing will also depend on header parameters (or other decoding parameters that are not included in every access unit).

It should be noted that the term advanced audio (AA) as used is this disclosure refer to different types of advanced audio formats. AA is a general term referring to various audio formats and while formats complying with ISO_IEC 14496-3 may be used in various embodiments of the invention, it is not limited to such types of formats. It is further noted that as aforementioned, the same techniques may be implemented, mutatis mutandis, to other types of media streams. For example, in embodiments in which a receiver may select to switch between signals received from various cameras that cover the same sport event, seamless splicing from media stream of one camera to that of another may be implemented.

Figure 1B:
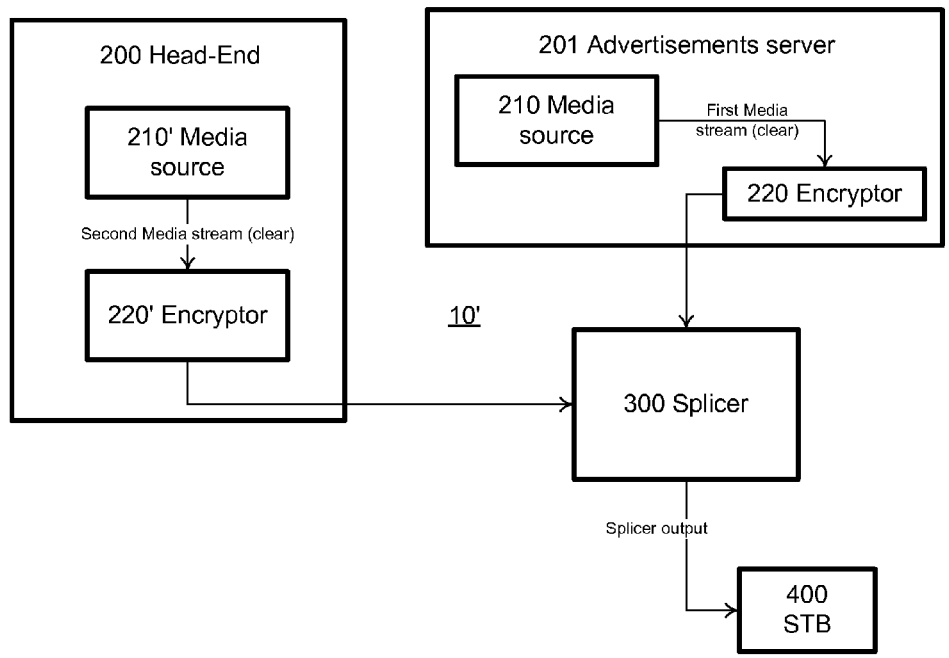

FIGS. 1A and 1B illustrate networks 10 and 10' operative for media content transmissions, according to various embodiments of the invention.

The network include one or more media sources 210 (e.g. media sources 210 and 210'), that are adapted to provide multiple media streams, such as first media stream 101 and second media stream 102. It is noted that in some embodiments of the invention, a media source 210 may provide more than a single media stream concurrently. For example, according to an embodiment of the invention, a single media source 210 provides both of first media stream 101 and second media stream 102.

One or more of the media sources 210 may be included in a head-end 200 of a cable system, but this is not necessarily so. According to an embodiment of the invention, one or more of the media sources 210 may be included in an advertisements server 201. It is noted that different media sources 210 that provides the first and second media streams 101 and 102 (and possibly other media streams) may be located in different locations (e.g. different geographical locations. For example, an advertisements server 201 may be located nearer to the end-user than the head-end. In another example, a media source 210 for a primary program stream (e.g. second media stream 102) may transmit the second media stream 102 over satellite connection (e.g. global broadcasting of a live sports event), while advertisement are added locally in each country or region.

The media streams (e.g. 101 and 102) are provided to a splicer 300, which is operable to concatenate different media streams one after the other. It is noted that in some embodiments of the invention, one or more of the media streams provided by media sources 210 may be encrypted and/or modulated and/or otherwise processed by one or more intermediate units, such as one or more encryptors, one or more encryptor/modulator and so forth. In FIGS. 1A and 1B the first and second media streams 101 and 102 are denoted 101' and 102' to visualize the encryption process. However, in the description below, the terms first and second media streams 101 and 102 may pertain to either encrypted or non-encrypted forms of those media streams.

The splicer transmits portions of multiple media streams toward end-user equipment (such as one or more set top boxes (STBs) 400) in a serial manner, wherein one media stream is conveniently immediately concatenated after another, so there is a smooth transmission between them. For example, second media stream 102 (that may be, by way of example, a primary program media stream) may be concatenated immediately after the first media stream 101 (that may be, by way of example, an advertisement media stream). It is noted that the splicing of the media streams does not necessarily occur at an end of the first media stream, and does not necessarily occur at a beginning of the second media stream.

Since, as aforementioned, second media stream 102 as provided by the respective media source 210 may not include available decoding parameters that are included at the access units whose timing matches the splicing time in which splicer 300 splices between first media stream 101 to second media stream 102. Therefore, at least one—and potentially all—of the solutions disclosed below are implemented in network 10 in order to facilitate a successful splicing. It is noted that in some embodiments of the invention, if implemented together, the various techniques disclosed below may have a synergetic affect, such that different techniques may be used in different moments (e.g. one technique may be used for non-encrypted media streams, while another techniques may be preferred for encrypted content).

It is furthermore noted that while some of the techniques discussed below are exemplified in relation to splicing over AA-tool are disclosed, those systems and methods can be expended and modified, e.g. to derive methods that are a combination of principal methods.

In all the systems and methods discussed below, the one or more second media stream include access units that may be categorized into at least two types: first access units that include decoding parameters, and second access units of which each second access unit does not include (i.e. lacks) decoding parameters sufficient for full decoding of that second access unit. It should be noted that second access units may be usefully decoded without the decoding parameters, but are no fully decodable without those parameters in that a quality of the media if decoded without those decoding parameters is generally lower than if decoded using those decoding parameters. In full decoding it is meant achieving decoding using those decoding parameters effective for achieving decoding of higher quality (wherein quality is usually quality of the media (e.g. video quality, audio quality), but may also be other type of quality (e.g. reducing chance of errors, etc.).

It should be noted that the decoding parameters referred to throughout the disclosure may not be the only decoding parameters used in the various media streams referred to that include them. The decoding parameters may be advanced decoding parameters that are provided in only some of the access units, while pertaining to a larger number of access units (and potentially to all the access units of the respective media stream). It is noted that other decoding parameters (e.g. more basic ones) may be also included in the media stream, and in some embodiments of the invention even in every access unit of it. The disclosure, however, refers especially to those decoding parameters that fulfill the aforementioned characteristics.

It is noted that in some embodiments of the invention, first access units may correspond to random access points of the second media stream, while second access units may response to non-random access units of the second media stream (i.e. to access units of the second media stream that are not random access points).

Decoding parameters included in each of the first access units are required for full decoding of at least one first access unit and of one or more second access units of the second media stream. It is noted that some of the access units of the second media stream may not be categorized in any of those categories (e.g. an access unit that include redundant decoding parameters, which are not essentials for decoding of any second access unit).

The first media stream may include first access units, second access units, other access units, and any combination of those three types.

Preprocessing of Media Streams

Figure 2:
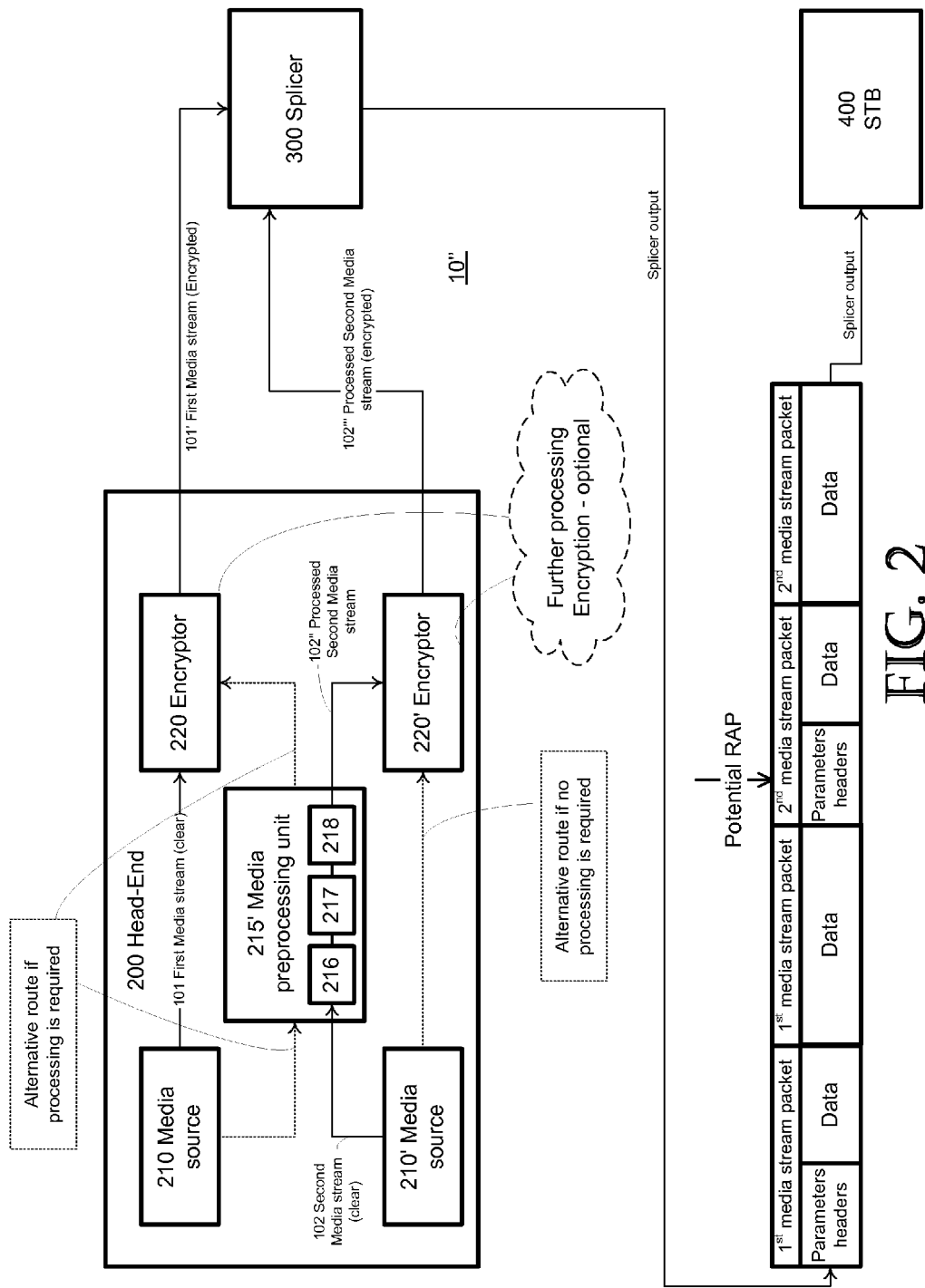
FIG. 2 illustrates a network in which splicing is facilitated, according to an embodiment of the invention.

FIG. 2 illustrates network 10" in which splicing is facilitated, according to an embodiment of the invention. According to an embodiment of the invention, the network 10 (e.g. network 10") further includes a media preprocessing unit 215, connected between the media source 210 that provides second media stream 102 and splicer 300. It is noted that the media preprocessing unit 215 may be part of the system that provides the second media stream 102 (e.g. of head-end 200, or of an advertisements server, etc.), but this is not necessarily so. Media preprocessing unit 215 may also be a stand alone unit.

It is further noted that in different embodiments of the invention, media preprocessing unit 215 may be located in different locations in respect to other intermediate units located between the media source 210 and splicer 300 (e.g. before or after an encryptor 220). Media preprocessing unit 215 is conveniently adapted to process the second media stream 102 before it is being transmitted to splicer 300, in order to enable splicing of first and second media streams 101 and 102 by splicer 300.

It is noted that media preprocessing unit 215 may be part of a system or network 10, and may also be part of another system, or a stand alone component (which may be, for example, integrated into other systems, or connected to other systems). Various functionalities of processor 215 (such as power connections, data connections, spatial configurations, and so forth) may be influenced by its relationships with other systems as exemplified above, as will be clear to a person who is of skill in the art.

Media preprocessing unit 215 may include, according to an embodiment of the invention, at least one input interface 216, at least one media-processor 217, and at least one transmitter 219. The at least one input interface 216 is configured to receive one or more media stream, and especially one or more second media streams 102. Each of the at least one second media streams 102 includes first access units (e.g. an audio access unit, a video access unit, an audio/video frame] that include decoding parameters, and second access units of which each second access unit does not include decoding parameters sufficient for full decoding of that second access unit. As aforementioned, decoding parameters included in each of the first access units of a second media stream 102 are required for decoding of at least one first access unit (e.g. that first access unit) and of one or more second access units of that second media stream 102.

First access units may be distributed within the second media stream 102 in different manners in different implementations. For example, first access units may be included in second media stream 102 in equal intervals, in intervals depending on content of second media stream 102, in intervals depending on modifications in the decoding parameters, and so forth. While different embodiments of the invention may be configured to handle different types of scattering, in some embodiments the distribution is irrelevant for future processing by media processing unit 215.

It is noted that in some embodiments of the invention, multiple second media streams 102 that are related to each other may be received (usually concurrently). For example, relating to the cable system example offered above, the second media streams 102 may include one video stream of a program, and multiple audio streams for that program in different languages. It is noted that one or more second media stream 102 received may also be related to other types of media stream. E.g. referring to the example above, it is noted that the video stream may be a regular media stream that includes decoding parameters in each access unit, and only the audio streams includes second access units.

It is noted that if multiple related media streams are received—some or all of them may be processed by media processing unit 215. It is noted that in some embodiments of the invention, related second media streams 102 may be processed by a single media processing unit 215, or by parallel media processing units 215. In some embodiments of the invention, a regular media stream that does not have access unit decoding parameters issues may also be processed by media processing unit 215, e.g. if it is related to the second media stream 102 and parallel processing is required for keeping of timing coherence between those media streams.

Media-processor 217 is configured to select one or more access units of the second media stream 102 for further processing by media-processor 217. It is noted that different algorithms and considerations may be used for determining which access units to select. It is noted that at least one of the one or more selected access units is selected as a "splicing event first access unit", which is expected to be the first access unit spliced into when splicing the second media stream 102 by a splicer (e.g. splicer 300). Such selected access units may also be referred to as potential Random Access Points.

It is noted that the selection of access units by media-processor 217 may usually be a selection of access units that may be used for splicing by the splicer. Multiple access units may be selected, in some embodiments of the invention, in different scenarios—e.g. when second media stream 102 is provided to multiple splicers, when a timing of the splicing is not certain, for providing back-up splicing event first access unit, slightly later than the original splicing event first access unit, and so forth.

According to an embodiment of the invention, media-processor 217 may be configured to identify, when or after selecting the access unit, whether it includes sufficient decoding parameters for decoding (e.g. whether it is a first access unit) or not, and if it is, it may not further process it. In such a case, media-processor 217 may either select another access unit, or not select another one. For example, if the access unit that matches the timing of the splicing event already includes sufficient decoding parameters, no further processing may be needed for second media stream 102 in some embodiments of the invention.

It is noted that media-processor 217 may select the selected access unit in response to a future timing of a splicing event, wherein indication of such timing may be received from the splicer or from another system (e.g. a unit that dictates splicing to the splicer. Such unit may be located in the head-end 200, but this is not necessarily so).

According to various embodiments of the invention, different rules may be used for the selection of access units into which decoding parameters (e.g. advanced audio (AA) headers) are added. For example, access units for writing of decoding parameters may be selected (a) per frame; (b) per Packetized elementary stream (PES) header; (c) per random Access Point (RAP); and/or (d) Upon an I-frame in the video stream, AA headers will be added to the respective audio frame which is also a potential splice in-point.

Media-processor 217 is further configured to process the second media stream 102 to provide a processed second media stream 102", wherein the processing includes writing into each of the one or more selected access units of second media stream 102 decoding parameters that are responsive to the decoding parameters of a previous first access unit. An access unit is considered a previous access unit in relation to another access unit if it is associated with a presentation time stamp that is earlier than the other access unit.

For example, media-processor 217 of media processing unit 215 may write to the selected access unit the very same decoding parameters of the previous first access unit. In another embodiment, media-processor 217 may write to the selected access unit decoding parameters that are responsive to the decoding parameters included in several preceding access units. In other embodiments, additional factors may be taken into account, such as decoding parameters of a first media stream 101 from which the splicing should be carried out.

According to an embodiment of the invention, media-processor 217 is configured to write decoding parameters into the selected access unit by writing into its header, or by creating a header to the selected access unit that includes the decoding parameters.

As aforementioned, media processing unit 215 may further include a transmitter for transmitting the processed second media stream 102" to a splicer (such as splicer 300). It is noted that the transmitting of the processed second media stream 102" may be intermediated by one or more intermediary systems or units, such as—for example—encryptor 220', that is adapted to encrypt processed second media stream 102", to provide an encrypted processed second media stream 102''', which is transmitted to the splicer.

As aforementioned, media-processor 217 may determine whether sufficient decoding parameters are comprised in the selected access unit (e.g. to determine whether to carry out the writing into the selected access unit in response to inclusion of sufficient decoding parameters in the selected access unit), and to selectively write decoding parameters to the selected access unit in response to a result of the determining (e.g. only if determining that the selected access unit does not include sufficient decoding parameters).

According to an embodiment of the invention, a splicer (such as splicer 300) may splice processed second media stream 102" after a first media stream 101, wherein the splicing is carried out in the selected access unit of the processed second access unit (i.e. the selected access unit is the first access unit of the processed second media stream 102" that is included in an output stream of the splicer).

As aforementioned, according to some embodiments of the invention media-processor 217 may select multiple access points of the second media stream. In some such embodiments of the invention, processor 217 may be configured to writing into the different selected access units of the second media stream 102 different decoding parameters. Such different parameters may be responsive to the decoding parameters of one previous access unit or more.

It should be noted that conveniently the transmitting of the processed second media stream 102" to the splicer is carried out over a network connection (e.g. cable network connection, internet connection, telephony network connection, LAN connection, WAN connection, and so forth), by a unit (e.g. media processing unit 215) that carries out the processing of the second media stream 102, and which is incapable of splicing. It is further noted that the splicer may be a remote splicer that is located in a different geographical location.

According to an embodiment of the invention, the processing of media-processor 217 may further include encoding, after the writing of the decoding parameters, at least a portion of the second media stream that includes the selected access unit.

In some embodiments of the invention, when receiver 216 receives second media stream 102 that includes multiple elementary streams (e.g. video+2 alternative audio streams), media-processor 217 may selecting access units for more than one of the multiple elementary stream, wherein different access units selected for different elementary stream may be aligned to each other (i.e. have corresponding timing), and may also be not aligned with each other. If non-aligned access units are selected for the different stream, according to an embodiment of the invention the splicer may fill a gap, in one or more of the media streams, with mute frames until a next potential in-point for that elementary stream.

FIG. 3 illustrates method 600 for media transmission, according to an embodiment of the invention. Method 600 is also referred to as "first method", in order to distinguish it from other methods described below. Method 600 may be used for preprocessing media streams, so that splicing is transparent for the splicer. In such a case, the splicer may not be required to take any special action (except maybe informing the system that implements method 600 about an intended timing of the splicing).

Referring to the examples set forth in the previous drawings, method 600 (and especially stages 610-640) may be carried out by a media processing unit such as media processing unit 215. It is further noted that various embodiments of media processing unit 215 may be reflected in various embodiments of method 600 (and vice versa), even if not explicitly elaborated.

Method 600 starts with stage 610 of receiving a second media stream (or more than one second media stream), wherein the second media stream includes first access units that include decoding parameters, and second access units of which each second access unit does not include decoding parameters sufficient for full decoding of that second access unit; wherein decoding parameters included in each of the first access units are required for full decoding of at least one first access unit (e.g. that first access unit) and of one or more second access units. As aforementioned, the second media stream may include other types of access units, but may also include only first access units and second access units. Referring to the examples set forth in the previous drawings, the receiving may be carried out by receiver 216.

It is noted that the receiving may be carried out over time, that in different times different second media streams may be received, and that additional media streams may be received during that time (other than the second media stream).

Stage 610 is followed by stage 620 of selecting an access unit of the second media stream. The selecting may be responsive to timing information received from a splicer, from a head-end, or from other network component in a network to which a unit that implements the selecting belongs (e.g. cables network). Referring to the examples set forth in the previous drawings, the selecting may be carried out by a media-processor such as media-processor 217. It is noted that in some embodiments of the invention, more than one access units may be selected (e.g. as exemplified in relation to media-processor 217). It is noted that different access units may be selected in different times (for example, a new access unit may be selected corresponding to each video or audio frame transmitted).

According to an embodiment of the invention, the selecting may include selecting multiple access points of the second media stream, wherein the processing includes writing into the different selected access units of the second media stream different decoding parameters responsive to the decoding parameters of at least one first access unit.

According to an embodiment of the invention, the selecting may include selecting the access unit in response to a future timing of a splicing event.

The selecting is followed by stage 630 processing the second media stream to provide a processed second media stream, wherein the processing includes stage 632 of writing into the selected access unit (e.g. to a header of which) of the second media stream decoding parameters that are responsive to the decoding parameters of at least one previous first access unit. The decoding parameters written may be the actual decoding parameters of the previous first access unit, but this is not necessarily so. It is noted that in other embodiments of the invention, decoding parameters of other previous access unit (that are not first access units) may be written instead, and/or decoding parameters that do not pertain to previous access units. For example, in an embodiment of the invention, a standard set of decoding parameters may be used for writing into the selected access unit.

According to various embodiments of the invention, decoding parameters may be written (e.g. as AA headers) into selected access units in different distributions, such as (a) per frame. (b) per PES header. (c) per RAP and/or (d) Upon an I-frame in the video stream. According to an embodiment of the invention, decoding parameters (e.g. AA headers) will be added to the respective audio frame which is also a potential splice in-point.

The processing is followed by stage 640 of transmitting the processed second media stream to a splicer. Referring to the examples set forth in the previous drawings, the transmitting may be carried out by a transmitter such as transmitter 218. It is noted that the transmitting may include transmitting the processed second media stream via one or more intermediary units (e.g. encoder, encryptor, modulator, stamper, etc.). It is further noted that the transmitting of stage 640 may be transmitting to any system that is capable of concatenating media streams one in succession to the other. Such a system usually needs decoding parameters to be included in the first access unit being concatenated into, which is facilitated by the writing in stage 632.

According to an embodiment of the invention, the transmitting may include transmitting over a network connection, by a unit that carries out the processing and which is incapable of splicing, the processed second media stream to the splicer that is a remote splicer located in a different geographical location.

According to an embodiment of the invention, the processing may further include encoding, after the writing of the decoding parameters, at least a portion of the second media stream that includes the selected access unit.

Method 600 may further include stage 650 of splicing from a first media stream to the processed media stream, wherein the splicing may be carried out in response to the decoding parameters written into the selected access unit of the processed second media stream. It is noted that stages 610-640 of method 600 may be carried out by components of a single system (e.g. media processing unit 215), and while stage 650 may be carried out by the same system, in other embodiments it is carried out by a separate and distinct system (e.g. the splicer, such as splicer 300). The distinct system may be located in a geographically remote location, and be connected to the system of stages 610-640 over a network connection such as cable networks cables.

According to an embodiment of the invention, method 600 may include splicing, by the splicer, the processed second media stream after a first media stream, wherein the splicing is carried out in the selected access unit of the processed second access unit.

Method 600 may further include stage 660 of transmitting a splicer output stream that includes at least a portion of the processed second media stream (and may conveniently include the portion that starts in the selected access unit) toward end-user equipment (e.g. towards an STB). It is noted that the transmitting of stage 660 may also include transmitting the splicer output stream before splicing towards the processed second media stream occurred, wherein in such time the splicer output stream would usually include another media stream such as portion of the first media stream. Referring to the examples set forth in the previous drawings, stage 660 may be carried out by a splicer such as splicer 300, and/or by other intermediary units (not illustrated) such as hubs etc.

Method 600 may further include stage 670 of displaying the splicer output stream that includes the at least portion of the processed second media stream on a display of the end-user equipment or on a display connected to the end-user equipment.

According to an embodiment of the invention, method 600 may further include determining whether to carry out the writing into the selected access unit in response to inclusion of sufficient decoding parameters in the selected access unit, wherein the writing is selectively carried out in response to a result of the determining.

According to an embodiment of the invention, the receiving may include receiving the second media stream that includes multiple elementary streams (e.g. video+2 alternative audio streams), wherein the selecting includes selecting different access units that are not aligned with each other for each of the multiple elementary streams. According to an embodiment of the invention, per audio stream, the gap may be filled with mute frames until a next potential in-point for that elementary stream.

It should be noted that conveniently the processing of the second media stream to provide the processed second media stream should take place prior to the splicing and encryption stages.

It is noted that method 600 may further include other stages such as receiving a first media stream, transmitting the first media stream (wherein the writing is carried out when already transmitting the first media stream), and splicing to transmit the second media stream, wherein the splicing including starting a transmission of the second media stream with the splicing event first AU.

It is noted that some or all of the additional stages may be carried out by a system/component external to the one which carries out the first disclosed three stages.

Adding Decoding Parameters Upon Splice Point

Figure 4:
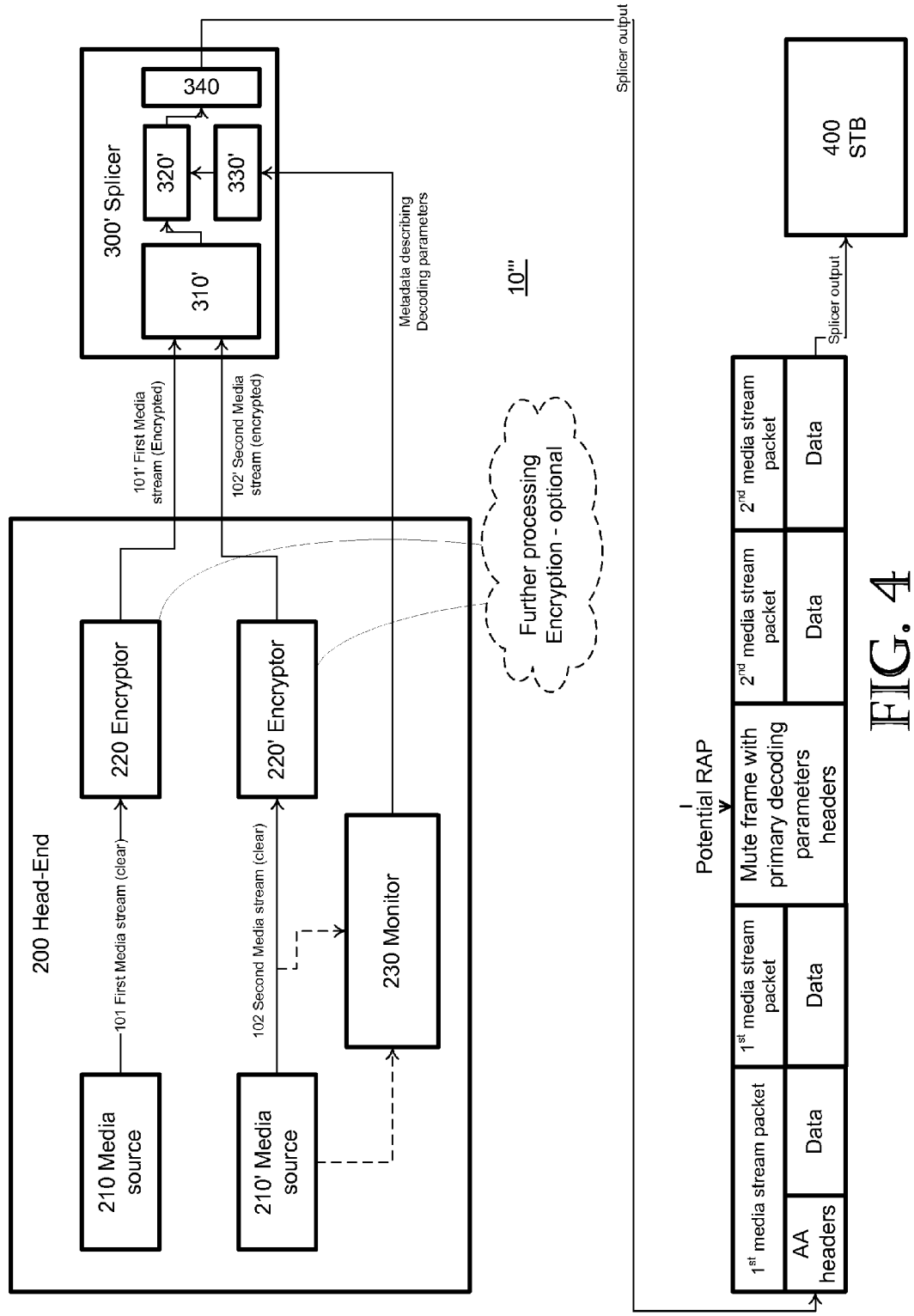
FIG. 4 illustrates a network in which splicing is facilitated, according to an embodiment of the invention.

FIG. 4 illustrates network 10''' in which splicing is facilitated, according to an embodiment of the invention. According to an embodiment of the invention, the network 10 (e.g. network 10''') further includes a media-stream monitor 230, connected between the media source 210 that provides second media stream 102 and splicer 300'.

Media stream monitor 320 may conveniently monitor the second media stream 102, and generate in response to the monitoring decoding-information that pertains to decoding parameters of at least one access unit of second media stream 102. The decoding-information may be, for example, decoding parameters included in the last monitoring first access unit of second media stream 102, an average (or other mathematical outcome) of decoding parameters of several last first access units of second media stream 102, and so forth.

It is noted that the monitor 230 may be part of the system that provides the second media stream 102 (e.g. of head-end 200, or of an advertisements server, etc.), but this is not necessarily so. Media-stream monitor 230 may also be a stand alone unit. It is noted that splicer 300' is discussed in detail in relation to FIG. 4. However, any of the other references to splicers 300 discussed elsewhere in the disclosure may be a splicer 300' as herein disclosed, or at least have some of the characteristics and/or components of splicer 300'. It is noted that splicer 300' (as well as other splicers 300 disclosed) may be located in a secondary distribution tier of a cable system, but this is not necessarily so.

It is noted that media-stream monitor 230 may transmit decoding-information to splicer 300' in response to a request of splicer 300', by its own decision, and/or in response to an instruction of another unit (e.g. the head-end, the advertisements server).

Splicer 300' includes output interface 340' for transmitting a media stream (also referred to as "splicer output media stream"), wherein the splicer output media stream may usually be transmitted over a network connection. Conveniently, output interface 340' of splicer 300' (as well as that of splicer 300) transmits the splicer output media stream towards an end-user equipment e.g. STB, cable-modem, etc). The splicer output media stream may include media responsive to different media streams received by the splicer in different times, wherein different media streams are usually concatenated to each other so there is no gap between consequent media streams as reflected in the splicer output media stream. Therefore, splicer 300' is configured to transmit media streams to at least one other unit. It is noted that at one or more of the at least one other unit may be a remote unit (e.g. the aforementioned end-user device), wherein the transmission to the remote unit may conveniently be a transmission over a network connection. It is further noted that those streams may be spliced into one or more output streams. It is noted that the transmitting to the end-user device may be intermediated by one or more intermediary units. It is further noted that the already spliced splicer output media stream may be spliced again with another media stream further down the channel between splicer 300' and the end-user device.

Conveniently, output interface 240 may be configured to transmit the first media stream 101 before the splicing event, and to transmit the processed second media stream after the splicing event.

Splicer 300' further includes one or more media-stream input interfaces 310', wherein each of the one or more media-stream input interfaces 310' is configured to receive one or more media streams. Such media-stream input interfaces are conveniently also included in other embodiments of splicer 300. At least one of the one or more media-stream input interfaces is configured to receive second media stream 102 (or multiple second media streams 102, that may be processed together or separately), wherein the second media stream 102 includes first access units that include decoding parameters, and second access units of which each second access unit does not include decoding parameters sufficient for full decoding of that second access unit; wherein decoding parameters included in each of the first access units are required for full decoding of at least one first access unit (e.g. that first access unit) and of one or more second access units. According to an embodiment of the invention, media-stream input interfaces 310' may receive media streams (e.g. second media stream 102) in an encrypted form (e.g. encrypted second media stream 102'), in a non-encrypted form, and in other forms of processing, modulating, and so forth. According to an embodiment of the invention, one of the one or more media stream input interfaces 310' receives first media stream 101.

According to an embodiment of the invention, splicer 300' may include decoding-information input interface 330' that is configured to receive decoding-information from a media-stream monitor 230 that monitors the second media stream 102, and that may, according to an embodiment of the invention, extract decoding parameters from access units of second media stream 102, and/or additional information (e.g. timing information).

According to an embodiment of the invention in which media-stream input interface 310' receives the second media stream 102 starting at an initiatory access unit of the second media stream, decoding-information input interface 330' may receive from media-stream monitor 230 the decoding-information that includes information pertaining to the at least one first access unit that is earlier than the initiatory access unit.

It is noted that in different embodiments of the invention, media-stream monitor 230 may receive second media stream 102 in different manners—for example, it may listen on a channel in which the second media stream 102 is transmitted towards splicer 300', it may receive another copy of the second media stream 102 from the respective media source 210, and so forth.

It is also noted that media-stream monitor 230 may monitor more than one media stream, from one or more media sources 210. Information pertaining to some or all of the media-stream monitored may be transmitted to splicer 300', and utilized by it in its processing of media streams.

According to an embodiment of the invention, media-stream monitor 230 may monitor decoding parameters headers (e.g. AA-tools headers) or other decoding parameters included (or which pertains to) second media stream 102. The monitoring of decoding parameters by media-stream monitor 230 may be carried out prior to encryption and splicing of the second media stream 102. Following monitoring, media-stream monitor 230 may generate metadata describing decoding parameters (metadata that may be included in the decoding-information sent to splicer 300'). To be used by the splicer. It is noted that the decoding-information may pertain to decoding parameters of at least one first access unit of the second media stream 102.

According to an embodiment of the invention, decoding-information input interface 330' may receive the decoding-information while the output interface 340' of splicer 300' transmits the first media stream. It is noted that in such timing, splicer 300' may not even receive the second media stream 102, but only the decoding-information pertaining to it. Especially, according to an embodiment of the invention, decoding-information input interface 330' may receive decoding-information that pertains to portions of the second media stream 102 that are not received by splicer 300' (e.g. earlier than a time in which splicer 300' starts receiving second media stream 102) and which is later used by splicer 300' when splicing into to the second media stream 102.

It is further noted that different schemes may be applied for providing of decoding-information from media-stream monitor 230 to splicer 300'. For example, media-stream monitor 230 may routinely provide information to splicer 300' (e.g. continuously, every predetermined duration, every first access unit monitored, every third first access unit monitored, and so forth), it may provide information to splicer 300' only when it is indicated that splicer 300' would splice into the second media stream 102 soon.

Splicer 300' further includes processor 320' which may conveniently include one or more media streams processors that is configured to process multiple media streams and providing an output media stream in which different media streams are spliced one into the other, and/or concatenated one after the other. It is noted that other implementations of splicer 300 would usually include a media streams processors as well (or other types of processors), also operating toward the same end. Processor 320'utilizes decoding-information received from media streams monitor 230 (a monitor that may conveniently be external to the splicer 300', potentially remote from it, e.g. in a remote geographical location).

Processor 320' is configured to process second media stream 102 in response to decoding-information that pertains to decoding parameters of at least one access unit of the second media stream and that is received from a media-stream monitor 230 that monitors second media stream 120, to provide a processed second media stream (not denoted), wherein the processing of second media stream 102.

According to an embodiment of the invention, the processing may include writing into at least one selected access unit of second media stream 102 decoding parameters that are responsive to decoding-information that pertains to decoding parameters of at least one access unit of the second media stream and that is received from a media-stream monitor 230 that monitors second media stream 120. It should be noted that conveniently, the unit from which the decoding-information is received (media-stream monitor 230) may be another unit from which the second media stream is received (e.g. media source 210', encryptor 220', etc.). Those two units can be distinct from one another, and even located in different geographical locations. Also, one media-stream monitor 230 may provide decoding-information that pertains to multiple media streams provided by multiple media sources 210, while a single media source 210 may transmit to the splicer multiple media streams that are monitored by different media-stream monitors 230.

According to some embodiments of the invention, processor 320' is configured to otherwise process the second media stream 102 to provide the processed second media stream (possibly instead of writing the decoding parameters into the selected access unit). According to an embodiment of the invention, processor 320' is configured to process at least a portion of second media stream 102 that follows the splicing point, in response to the decoding-information that was detected during the monitoring (e.g. while the first media stream was transmitted).

For example, processor 320' may process a portion of the second media stream 102 (and possibly only that portion) that starts at the splicing point, and ends at the first access unit that includes sufficient decoding parameters, so that a receiving entity will not need additional decoding parameters for that portion—because of its processing.

Splicer 300' is configured to splice the transmission of the output interface from transmission of a first media stream (e.g. first media stream 101) into transmission to the other unit (that may be a remote unit, e.g. STB 400, e.g. over the network connection) of the processed second media stream. It should be noted that conveniently, splicer 300' may be configured to splice between transmission of one media stream to another many a time (e.g. upon instructions from head-end 200, from an advertisements manager, etc.), and so forth.

Not all those switchings and/or splices necessarily involve processing of the media stream spliced into. For example, some of the media streams spliced into may originally include sufficient decoding parameters for decoding without further processing. Some of the media streams spliced into may be previously processed by a remote media processing unit (e.g. as exemplified in relation to FIGS. 2 and 3), some of the media streams spliced into may not involve complex decoding parameters at all and so forth.

According to various embodiments of the invention, processor 320' is configured to select the selected access unit in many ways. It is noted that in other embodiments of the invention, at least some of the selected access units may be selected by a remote entity (e.g. head-end 200, advertisements manager 201, etc.).

According to an embodiment of the invention, processor 320' is configured to select one or more access units of the second media stream 102 (as selected access units for further processing by processor 320'). It is noted that different algorithms and considerations may be used for determining (either by processor 320', or by another unit—of splicer 300' or external to it) which access units to select. It is noted that at least one of the one or more selected access units may be selected as a "splicing event first access unit", which is expected to be the first access unit spliced into when splicing the second media stream 102 by splicer 300'.

It is noted that the selection of access units by processor 320' may usually be a selection of access units that may be used for splicing by the splicer. Multiple access units may be selected, in some embodiments of the invention, in different scenarios—e.g. when a timing of the splicing is not certain, for providing back-up splicing event first access unit, slightly later than the original splicing event first access unit, and so forth.

According to an embodiment of the invention, processor 320' may be configured to identify, when or after selecting the access unit, whether it includes sufficient decoding parameters for decoding (e.g. whether it is a first access unit) or not, and if it is, it may not further process it. In such a case, processor 320' may either select another access unit, or not select another one. For example, if the access unit that matches the timing of the splicing even already includes sufficient decoding parameters, no further processing may be needed for second media stream 102 in some embodiments of the invention.

It is noted that processor 320' may select the selected access unit in response to a future timing of a splicing event, wherein indication of such timing may be determined by processor 320', and may also be received from another system (e.g. a unit that dictates splicing to the splicer. Such unit may be located in the head-end 200, but this is not necessarily so).

According to various embodiments of the invention, different rules may be used for the selection of access units into which decoding parameters (e.g. advanced audio (AA) headers) are added. For example, access units for writing of decoding parameters may be selected by processor 320': (a) per frame; (b) per Packetized elementary stream (PES) header; (c) per random Access Point (RAP); and/or (d) Upon an I-frame in the video stream, AA headers will be added to the respective audio frame which is also a potential splice in-point.

According to an embodiment of the invention, processor 320' may determine whether to carry out the writing into the selected access unit in response to inclusion of sufficient decoding parameters in the selected access unit, and to selectively write decoding parameters to the selected access unit in response to a result of the determining (e.g. only if determining that the selected access unit does not include sufficient decoding parameters).

It should be noted that in different embodiments of the invention, processor 320' may process second media stream 102 in many ways, such as writing of decoding parameters, of rate shaping, etc. According to an embodiment of the invention, the processing of the second media stream 102 includes only writing of deciding parameters to the first access unit included in the spliced output stream.

It is further noted that in different embodiments of the invention, processor 320' may use different techniques for writing the decoding parameters into second media stream 102.

For example, according to an embodiment of the invention, processor 320' may generate a decoding parameters header (e.g. AA-tools header) and write it into the second media stream 102. According to an embodiment of the invention, processor 320' is configured to insert a new mute frame into the second media stream 102, wherein the new mute frame includes a decoding parameters header that includes decoding parameters that are responsive to the decoding-information received from the media-stream monitor 230.

According to an embodiment of the invention, processor 320' is configured to modify an existing access unit of the second media stream 102 (e.g. by writing decoding parameters to its existing header, or by generating a new header to it).

Conveniently, processor 320' may be configured to write the decoding parameters into in a portion of second media stream 102 that does not include decoding parameters prior to the processing According to an embodiment of the invention, second media stream 102 may comply with a standard that imposes predefined headers on the primary stream, wherein the monitoring by media-stream monitor 230 can be replaced by detecting heeder information of one or more headers that are located in locations predefined in the standard.

Figure 5:
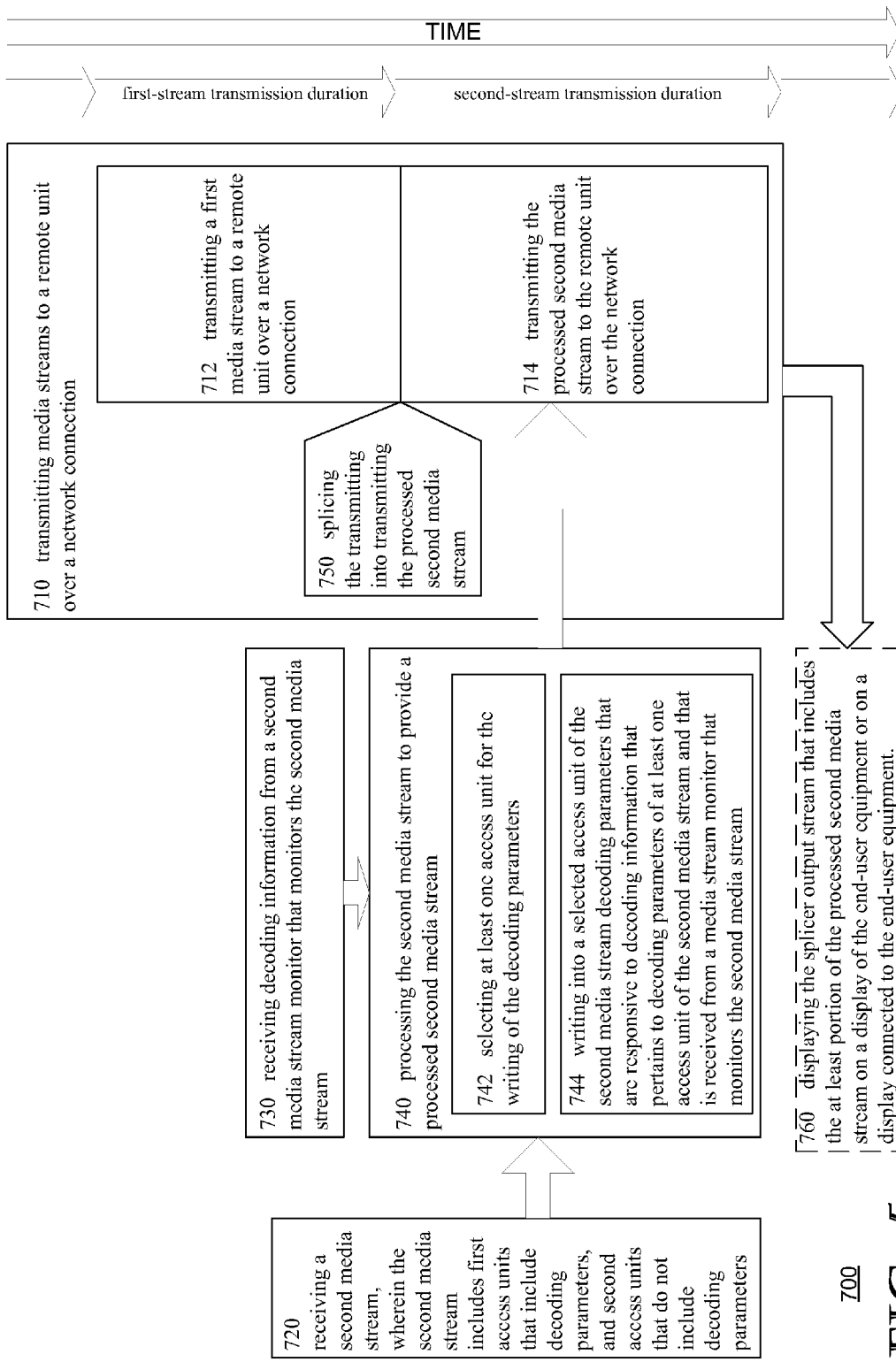
FIG. 5 illustrates a method for media transmission, according to an embodiment of the invention.

FIG. 5 illustrates method 700 for media transmission, according to an embodiment of the invention. Method 700 is also referred to as "second method", in order to distinguish it from other methods disclosed. Referring to the examples set forth in the previous drawings, method 700 (and especially stages 710-750) may be carried out by a splicer such as splicer 300, and especially such as splicer 300'. It is further noted that various embodiments of splicer 300' may be reflected in various embodiments of method 700 (and vice versa), even if not explicitly elaborated.

Method 700 may include stage 710 of transmitting media streams to at least one another unit. It is noted that the transmitting of the media streams may be a transmitting of the media stream to one or more remote units over one or more network connections. The network connection may be a cable system connection, or other types of connection (e.g. LAN, WAN, ADSL, etc.). The other unit may be an end-user device (e.g. STB), another unit of the network, and so forth. It is noted that different media streams are transmitted to the other unit at different times, wherein different media streams are usually spliced/concatenated so the transmission between them is smooth. Referring to the examples set forth in the previous drawings, stage 710 may be carried out by output interface 340'. The transmitting may be implemented in many ways (such as the many ways for transmission of media streams that are known in the art), according to various protocols (e.g. the different generations of the MPEG standard), and so forth.

It is noted that all stages of transmitting of media stream by the splicer may involve transmission of respective media streams to more than one remote system. For example, one or more media streams (identical or not) may be provided to multiple STBs in different geographical location, by a single splicer.

Method 700 includes stage 712 of transmitting a first media stream to another unit (possibly the other unit of stage 710). It is noted that also in stage 712, the transmitting may include transmitting of the first media stream to a remote unit and/or transmitting over a network connection. It is noted that stage 712 may be part of stage 710, but this is not necessarily so. The first media stream may be, for example, an advertisement stream, a primary program stream, and so forth. The first media stream may be a video stream, an audio stream, or other type of media stream. It is noted that the transmitting of the first stream is usually carried out during a first-stream transmission duration. Prior to that duration, the splicer may transmit other media stream, and may not transmit media streams (e.g. if the first media stream is the first media stream transmitted after activation of the splicer). Referring to the examples set forth in the previous drawings, stage 712 may be carried out by output interface 340'.

Method 700 further includes stage 720 of receiving a second media stream, wherein the second media stream includes first access units that include decoding parameters, and second access units of which each second access unit does not include decoding parameters sufficient for full decoding of that second access unit; wherein decoding parameters included in each of the first access units are required for full decoding of at least one first access unit (e.g. that first access unit) and of one or more second access units. It is noted that the receiving of the second media stream may be carried out at least partly concurrently to a receiving of the first media stream (not illustrated) and/or to the transmitting of the first media stream in stage 712. Conveniently, the receiving of the second media stream may start a short time before the splicer should output the second media stream. Referring to the examples set forth in the previous drawings, stage 720 may be carried out by one or more media-stream input interfaces such as media-stream input interface 310'. It is further noted that in some embodiments of the invention, method 700 may include reception of multiple media streams (sequentially and/or concurrently) that need to be outputted by the splicer—wherein some of those media streams may require processing (e.g. in stage 740)—but not necessarily all of them.

Method 700 may include stage 730 of receiving decoding-information from a second media-stream monitor (that is usually included in a remote unit, such as the head-end of a cable-system, or an advertisements manager) that monitors the second media stream. The decoding-information may pertain at least to decoding parameters of at least one first access unit of the second media stream. Referring to the examples set forth in the previous drawings, the receiving of stage 730 may be carried out by a decoding-information input interface such as decoding-information input interface 330'.

It is noted that in different embodiments of the invention, the decoding-information may be received in different timings and for different durations. For example, in some embodiments of the invention decoding-information pertaining to one or more media streams may be received continuously (from one or more media-stream monitors), while in other embodiments decoding-information of a certain media stream may be received only in proximity to the splicing by the splicer to that media stream. According to an embodiment of the invention, stage 730 may even include receiving of decoding-information consisting substantially only of decoding parameters of a first access unit monitored just before the timing of the splicing.

According to an embodiment of the invention, the received decoding-information is generated by the media-stream monitor by monitoring decoding parameters headers (e.g. AA-tools headers) prior to encryption of the second media stream.

According to an embodiment of the invention, stage 730 may be at least partly concurrent to the stage 712 of transmitting the first media stream, and may also be at least partly concurrent to a receiving of the first media stream and/or of the second media stream.

It is noted that, according to an embodiment of the invention, the receiving of stage 720 includes receiving a second media stream starting at an initiatory access unit of the second media stream; wherein the receiving of stage 730 may include receiving, from the media-stream monitor, the decoding-information that includes information pertaining to the at least one first access unit that is earlier than the initiatory access unit.

Stage 740 of method 700 includes processing the second media stream to provide a processed second media stream. The processing of stage 740 may include processing the second media stream in response to decoding-information that pertains to decoding parameters of at least one access unit of the second media stream and that is received from a media-stream monitor that monitors the second media stream.

The processing may include stage 744 of writing into a selected access unit of the second media stream decoding parameters that are responsive to decoding-information that pertains to decoding parameters of at least one access unit of the second media stream and that is received from a media-stream monitor that monitors the second media stream. Referring to the examples set forth in the previous drawings, stage 740 may be carried out by a processor of the splicer, such as processor 320.

According to an embodiment of the invention, the processing of stage 740 (and especially stage 744) may include inserting a new mute frame into the second media stream, wherein the new mute frame includes a decoding parameters header that includes decoding parameters that are responsive to the decoding-information received from the media-stream monitor.

It is noted that, according to an embodiment of the invention, method 700 may also include stage 742 of selecting at least one access unit for the writing of the decoding parameters. Referring to the examples set forth in the previous drawings, the selecting may also be carried out by processor 320'.

According to various embodiments of the invention, the selecting of the one or more selected access units may be implemented in many ways. It is noted that in other embodiments of the invention, at least some of the selected access units may be selected by a remote entity.

According to an embodiment of the invention, the selecting of stage 742 may include selecting one or more access units of the second media stream (as selected access units for further processing). It is noted that different algorithms and considerations may be used for determining which access units to select. It is noted that at least one of the one or more selected access units may be selected as a "splicing event first access unit", which is expected to be the first access unit spliced into when splicing the second media stream by the splicer.

It is noted that the selection of stage 742 may usually be a selection of access units that may be used for splicing by the splicer. Multiple access units may be selected, in some embodiments of the invention, in different scenarios—e.g. when a timing of the splicing is not certain, for providing back-up splicing event first access unit, slightly later than the original splicing event first access unit, and so forth.

According to an embodiment of the invention, method 700 may also include as stage of identifying, when or after selecting the access unit, whether it includes sufficient decoding parameters for decoding (e.g. whether it is a first access unit) or not, and if it is, further stages of processing (e.g. stage 744) may be determined to be skipped. In such a case, the selecting of stage 742 may either include selecting another access unit, or not selecting another one. For example, if the access unit that matches the timing of the splicing even already includes sufficient decoding parameters, no further processing may be needed for the second media stream in some embodiments of the invention.

It is noted that the selecting may include selecting the selected access unit in response to a future timing of a splicing event, wherein indication of such timing may be determined by the processor that carried out stage 744, and may also be received from another system (e.g. a unit that dictates splicing to the splicer. Such unit may be located in a head-end, but this is not necessarily so).

According to various embodiments of the invention, different rules may be used for the selecting of stage 742 that may be a selection of access units into which decoding parameters (e.g. advanced audio (AA) headers) are added. For example, access units for writing of decoding parameters may be selected: (a) per frame; (b) per Packetized elementary stream (PES) header; (c) per random Access Point (RAP); and/or (d) Upon an I-frame in the video stream, AA headers will be added to the respective audio frame which is also a potential splice in-point.

Method 700 further includes stage 750 of splicing the transmitting into transmitting the processed second media stream to other unit (e.g. the remote unit, such as end-user device, wherein the transmitting may be a transmitting over the network connection). Referring to the examples set forth in the previous drawings, stage 750 may be carried out by processor 320', by output interface 340', and/or by coordination thereof. It is noted that conveniently, stage 750 may include transmitting at least a portion of the processed second media stream that includes the decoding parameters written in stage 744.

Method 700 may therefore further include stage 714 of transmitting the second processed media to the other unit (e.g. the remote unit, over the network connection). Referring to the examples set forth in the previous drawings, stage 714 may be carried out by output interface 340'. It is noted that conveniently, stage 714 may include transmitting at least a portion of the processed second media stream that includes the decoding parameters written in stage 744. Stage 714 may be a part of stage 710, but this is not necessarily so.

According to an embodiment of the invention, method 700 may further include stage 760 of displaying a splicer output stream that includes the at least portion of the processed second media stream on a display of the end-user equipment or on a display connected to the end-user equipment. It is noted that the displaying may be carried out substantially in parallel to the transmitting of stage 710 (in which the splicer output stream may be transmitted)—given a certain delay of the network connection, even though this is not necessarily so.

It is noted that apart from displaying—a system that receives the splicer output stream (or other streams transmitted by the splicer) may carry out additional types of actions with that stream, such as record it, delay it, ignore it, further process it, route it to another system, and so forth.

According to an embodiment of the invention, the second media stream complies with a standard that imposes predefined headers on the primary stream, wherein the monitoring can be replaced by detecting heeder information of one or more headers that are located in locations predefined in the standard.

Retreating to Lower Quality

Figure 6:
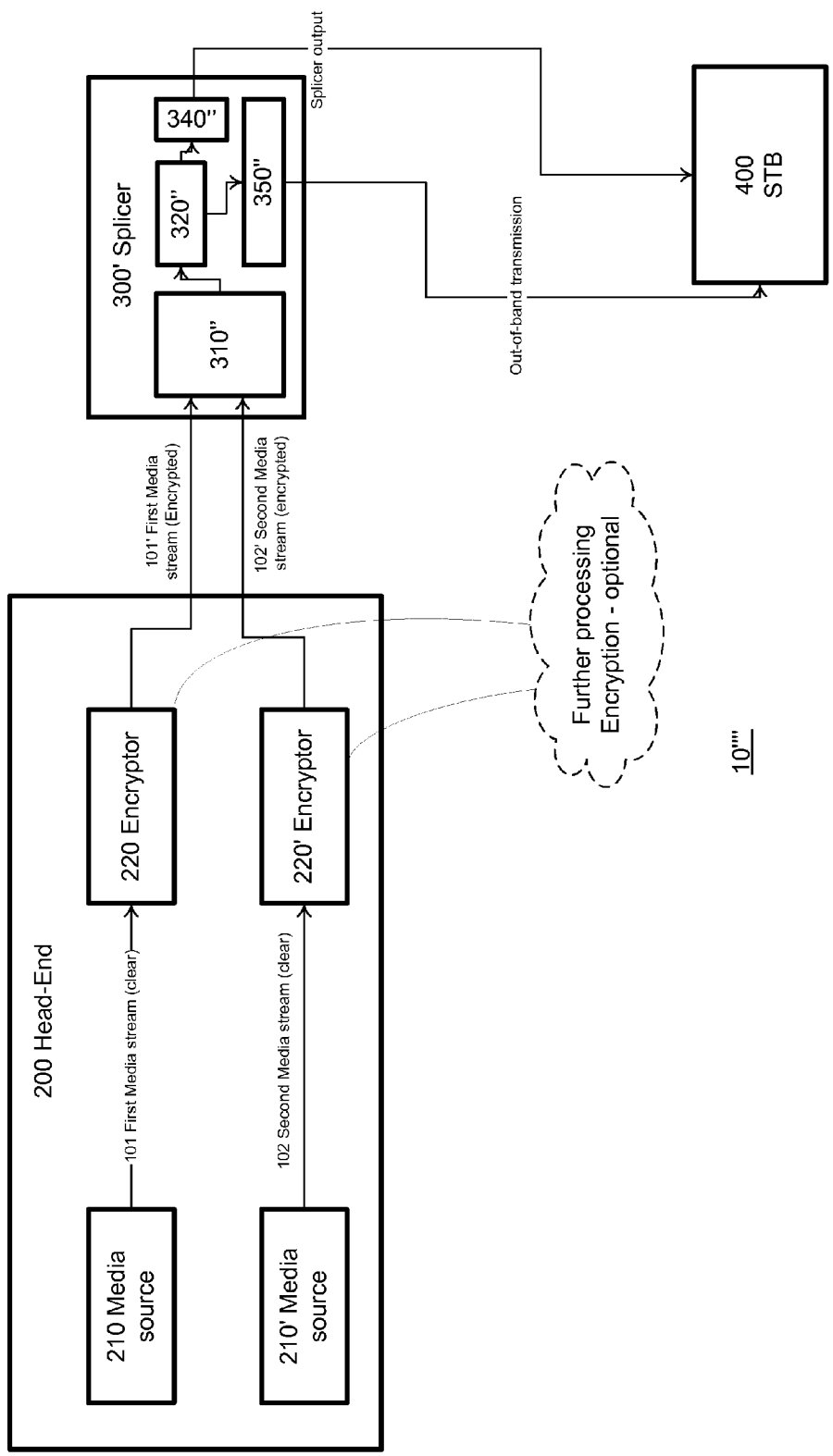
FIG. 6 illustrates a network in which splicing is facilitated, according to an embodiment of the invention.

FIG. 6 illustrates network 10'''' in which splicing is facilitated, according to an embodiment of the invention. According to an embodiment of the invention, the network 10 (e.g. network 10") includes splicer 300". It is noted that splicer 300" is discussed in detail in relation to FIG. 4. However, any of the other references to splicers 300 discussed elsewhere in the disclosure may be a splicer 300" as herein disclosed, or at least have some of the characteristics and/or components of splicer 300". It is noted that splicer 300" (as well as other splicers 300 disclosed) may be located in a secondary distribution tier of a cable system, but this is not necessarily so.

Splicer 300" includes output interface 340" for transmitting a media stream (also referred to as "splicer output media stream"), wherein the splicer output media stream may usually be transmitted over a network connection. Conveniently, output interface 340" of splicer 300" (as well as that of splicer 300) transmits the splicer output media stream towards an end-user equipment e.g. STB, cable-modem, etc). The splicer output media stream may include media responsive to different media streams received by the splicer in different times, wherein different media streams are usually concatenated to each other so there is no gap between consequent media streams as reflected in the splicer output media stream. Therefore, splicer 300" is configured to transmit media streams to at least one other unit. It is noted that at one or more of the at least one other unit may be a remote unit (e.g. the aforementioned end-user device), wherein the transmission to the remote unit may conveniently be a transmission over a network connection. It is further noted that those streams may be spliced into one or more output streams. It is noted that the transmitting to the end-user device may be intermediated by one or more intermediary units. It is further noted that the already spliced splicer output media stream may be spliced again with another media stream further down the channel between splicer 300' and the end-user device.

Splicer 300' further includes one or more media-stream input interfaces 310', wherein each of the one or more media-stream input interfaces 310' is configured to receive one or more media streams. Such media-stream input interfaces are conveniently also included in other embodiments of splicer 300. At least one of the one or more media-stream input interfaces is configured to receive second media stream 102 (or multiple second media streams 102, that may be processed together or separately), wherein the second media stream 102 includes first access units that include decoding parameters, and second access units of which each second access unit does not include decoding parameters sufficient for full decoding of that second access unit; wherein decoding parameters included in each of the first access units are required for full decoding of at least one first access unit (e.g. that first access unit) and of one or more second access units. According to an embodiment of the invention, media-stream input interfaces 310' may receive media streams (e.g. second media stream 102) in an encrypted form (e.g. encrypted second media stream 102'), in a non-encrypted form, and in other forms of processing, modulating, and so forth. According to an embodiment of the invention, one of the one or more media stream input interfaces 310' receives first media stream 101.

Splicer 300" is configured to splice the transmission of output interface 340" from transmission of a first media stream into transmission to the other unit of the second media stream 102; wherein output interface 340" is further configured to: (a) transmit the second media stream 102 at a first quality from a timing of the splicing until a quality enhancing moment, and (b) transmit the second media stream 102 at a higher quality that is higher than the first quality after the quality enhancing moment.

According to an embodiment of the invention, output interface 340" is configured to transmit the second media stream 102 at the first quality by transmitting a portion of the second media stream 102 without access units that include decoding parameters required for full decoding of first access units and of second access units, and to transmit the second media stream 102 at the higher quality by transmitting a portion of the second media stream 102 with at least one access unit that includes decoding parameters required for full decoding of at least one first access unit and of one or more second access units. It is noted that, according to an embodiment of the invention, the at least one access unit that includes decoding parameters required for full decoding of at least one first access unit and of at least one second access units is a first access unit originally included in the second media stream 102 as received.

It is further noted that in such an embodiment of the invention, the second media stream 102 may be transmitted by splicer 300" without processing. However, e.g. as demonstrated below, splicer 300" (and especially processor 320") may process second media stream 102 prior to transmission to the other unit.

According to an embodiment of the invention, splicer 300' includes out-of-band-transmitter 350", configured to transmit to the other unit (e.g. STB 400) over an out-of-band (OOB) channel (other than the channel used for the transmission of the second media stream) an instruction to play the second media stream 102 at the first quality (e.g. having basic audio) as long as decoding parameters required for full decoding of first and second access units are not up-to-date.

According to some embodiments of the invention, the OOB instruction may instruct the other unit (e.g. STB 400) to decode second media stream 102 in one of the following modes: (a) Regular Mode: no special attention is needed; and (b) Ignore AA-tools.

According to an embodiment of the invention, splicer 300" includes processor 320" operable to write new decoding parameters into the second media stream, wherein the output interface is operable to transmit the second media stream at the first quality by starting a transmission of the second media stream with an access unit of the second media stream that includes the new decoding parameters. It is noted that the new decoding parameters written according to such an embodiment of the invention may usually be not-responsive to information received from a media stream monitor (such as media stream monitor 320) that monitors the second media stream (especially at a remote location) and which generates decoding-information in response to the monitoring. It is noted that such monitoring is usually not required in such an embodiment of the invention, and that such media stream monitor is not necessarily implemented in such an embodiment of the invention.

Figure 7:
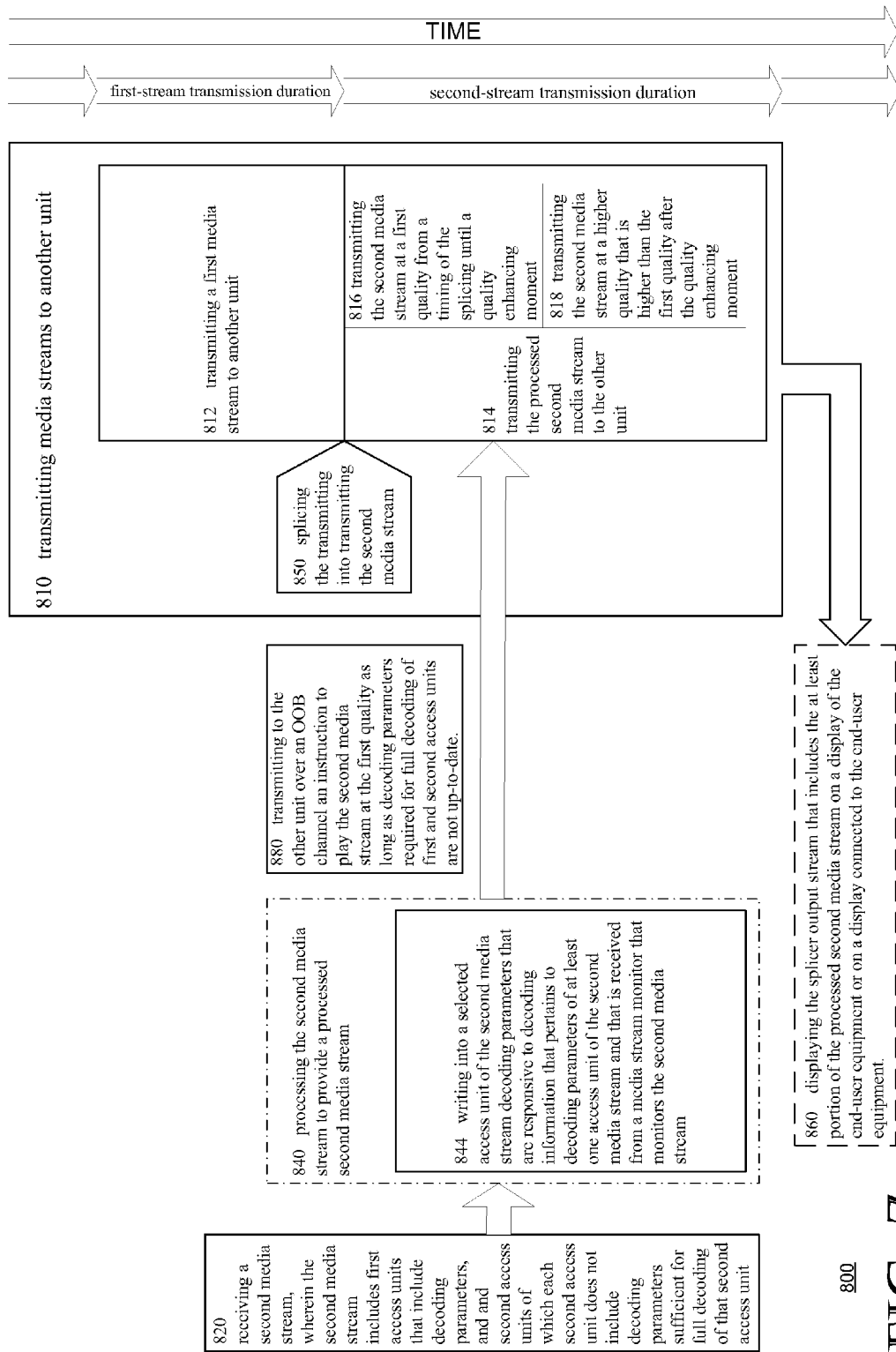
FIG. 7 illustrates a method for transmitting media, according to an embodiment of the invention.

FIG. 7 illustrates method 800 for transmitting media, according to an embodiment of the invention. Method 800 is also referred to as "second method", in order to distinguish it from other methods disclosed. Referring to the examples set forth in the previous drawings, method 800 (and especially stages 810-850) may be carried out by a splicer such as splicer 300, and especially such as splicer 300". It is further noted that various embodiments of splicer 300" may be reflected in various embodiments of method 800 (and vice versa), even if not explicitly elaborated.

Method 800 may include stage 810 of transmitting media streams to at least one another unit. It is noted that the transmitting of the media streams may be a transmitting of the media stream to one or more remote units over one or more network connections. The network connection may be a cable system connection, or other types of connection (e.g. LAN, WAN, ADSL, etc.). The other unit may be an end-user device (e.g. STB), another unit of the network, and so forth. It is noted that different media streams are transmitted to the other unit at different times, wherein different media streams are usually spliced/concatenated so the transmission between them is smooth. Referring to the examples set forth in the previous drawings, stage 810 may be carried out by output interface 340". The transmitting may be implemented in many ways (such as the many ways for transmission of media streams that are known in the art), according to various protocols (e.g. the different generations of the MPEG standard), and so forth.

It is noted that all stages of transmitting of media stream by the splicer may involve transmission of respective media streams to more than one remote system. For example, one or more media streams (identical or not) may be provided to multiple STBs in different geographical location, by a single splicer.

Method 800 may include stage 812 of transmitting a first media stream to another unit (possibly the other unit of stage 810). It is noted that also in stage 812, the transmitting may include transmitting of the first media stream to a remote unit and/or transmitting over a network connection. It is noted that stage 812 may be part of stage 810, but this is not necessarily so. The first media stream may be, for example, an advertisement stream, a primary program stream, and so forth. The first media stream may be a video stream, an audio stream, or other type of media stream. It is noted that the transmitting of the first stream is usually carried out during a first-stream transmission duration. Prior to that duration, the splicer may transmit other media stream, and may not transmit media streams (e.g. if the first media stream is the first media stream transmitted after activation of the splicer). Referring to the examples set forth in the previous drawings, stage 812 may be carried out by output interface 340".

Method 800 further includes stage 820 of receiving a second media stream, wherein the second media stream includes first access units that include decoding parameters, and second access units of which each second access unit does not include decoding parameters sufficient for full decoding of that second access unit; wherein decoding parameters included in each of the first access units are required for full decoding of at least one first access unit (e.g. that first access unit) and of one or more second access units. It is noted that the receiving of the second media stream may be carried out at least partly concurrently to a receiving of the first media stream (not illustrated) and/or to the transmitting of the first media stream in stage 812. Conveniently, the receiving of the second media stream may start a short time before the splicer should output the second media stream. Referring to the examples set forth in the previous drawings, stage 820 may be carried out by one or more media-stream input interfaces such as media-stream input interface 310". It is further noted that in some embodiments of the invention, method 800 may include reception of multiple media streams (sequentially and/or concurrently) that need to be outputted by the splicer—wherein some of those media streams may require processing (e.g. in stage 840)—but not necessarily all of them.

Method 800 further includes stage 850 of splicing the transmitting into transmitting the second media stream (either processed or not) to the other unit (denoted stage 814); wherein the transmitting of the second media stream includes: (a) stage 816 of transmitting the second media stream at a first quality from a timing of the splicing until a quality enhancing moment, and (b) stage 818 of transmitting the second media stream at a higher quality that is higher than the first quality after the quality enhancing moment.

According to an embodiment of the invention, stage 816 includes transmitting a portion of the second media stream without access units that include decoding parameters required for full decoding of at least one first access unit and of at least one second access units.

According to an embodiment of the invention, stage 818 includes transmitting a portion of the second media stream with at least one access unit that includes decoding parameters required for full decoding of at least one first access unit and of one or more second access units (usually a first access unit originally included in the second media stream). It is noted that generally the second media stream may be transmitted without processing, but this is not necessarily so.

According to an embodiment of the invention, method 800 further includes stage 880 of transmitting to the other unit over an out-of-band channel (other than the channel used for the transmission of the second media stream) an instruction to play the second media stream at the first quality (e.g. having basic audio) as long as decoding parameters required for full decoding of first and second access units are not up-to-date. In different embodiments of the invention, the instruction may usually transmitted before the transmission of the second media stream to the other entity (e.g. a short time before the transmission), or concurrently with the starting of the transmission of the second media stream to the other unit. It is however noted that other timing schemes may be applied in other embodiments of the invention.

According to an embodiment of the invention, method 800 may include stage 840 of processing the second media stream before its transmission to the remote unit. The processing of stage 840 may be a standard processing in case sufficient decoding parameters are not included in the first access unit of the second media stream to be transmitted to the other unit. However, the processing may be irrespective to content of the second media stream. Especially, the processing of stage 840 is usually not responsive to decoding-information that pertains to decoding parameters of at least one access unit of the second media stream and that is received from a media-stream monitor that monitors the second media stream/

The processing of stage 840 may include stage 844 of writing into the second media-stream new decoding parameters. Those decoding parameters may be written, for example, in an existing access unit of the second media stream, in a newly added mute access unit of the second media stream, and so forth. According to an embodiment of the invention, the new decoding parameters are determined irrespectively to content of the second media stream (e.g. standard decoding parameters, decoding parameters selected in response to a condition of the splicer and/or to a condition of the remote unit, and so forth).

According to an embodiment of the invention in which stage 844 is implemented, the transmitting at the first quality of stage 816 may start at transmitting an access unit that includes the new decoding parameters.

The writing may be preceded by selecting a selected access unit of the second media stream into which the new decoding parameters are to be written. Such a selection would usually include selecting the first access unit to be transmitted to the other unit (either an existing access unit or new one—e.g. mute—to be created). Such selecting may be carried out by a processor of the splicer, such as processor 320". According to various embodiments of the invention, the selecting of the one or more selected access units may be implemented in many ways. It is noted that in other embodiments of the invention, at least some of the selected access units may be selected by a remote entity.

According to an embodiment of the invention, the processing of stage 840 (and especially stage 844) may include inserting a new mute frame into the second media stream, wherein the new mute frame includes a decoding parameters header that includes the new decoding parameters.

According to some embodiments of the invention (e.g. as exemplified in relation to FIGS. 6 and 7), when splicing to the second media stream (e.g. return to primary from ads stream), the transmitting of the second media stream includes temporary fallback to a first quality (e.g. basic AA quality) without supporting a higher second quality (e.g. quality of AA-tools), wherein the transmitting includes transmitting the second media stream at the second quality after sufficient decoding parameters (or other required parameters) were retrieved. For example, upon a RAP, quality will return to full AA quality. Fallback to basic AA quality with no AA-tools can be performed in one of the following techniques. For example, when transmitting in the first quality AA parameters can be deleted or changed to a known AA parameter set over clear streams. Such a technique may be used, for example, when audio is encoded as AA with implicit AA-tool extensions and when every audio PES headers and RAP are aligned.

It is noted that in some embodiments of the invention, a fourth technique may be implemented in which audio is muted in a section where appropriate AA-tools header parameters are not available (wherein, according to an embodiment of the invention, mute frames should be generated with ad AA parameters). This fourth technique is suitable for systems and/or methods where all headers are repeated with sufficient frequency.

Synergetic Solutions

While the above techniques (disclosed under the respective titles Preprocessing of Media Streams; Adding Decoding Parameters upon Splice Point; and Retreating to Lower Quality) are useful individually, the inventors found that combinations of two or more of the above techniques can be combined to construct a solution that best matches a given system.

Figure 8:
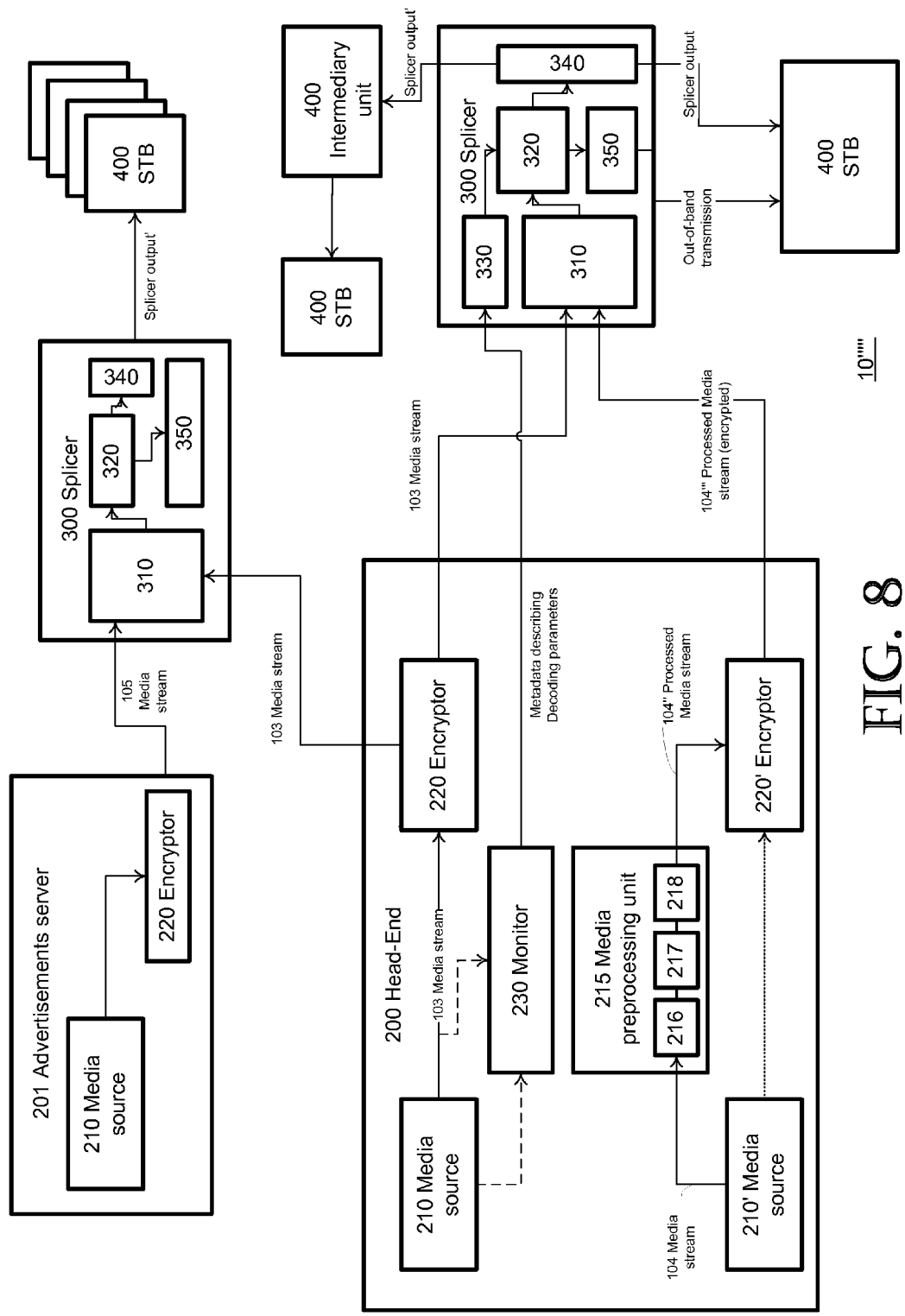
FIG. 8 illustrates a network in which splicing is facilitated, according to an embodiment of the invention.

FIG. 8 illustrates network 10'''' in which splicing is facilitated, according to an embodiment of the invention. According to an embodiment of the invention, the network 10 (e.g. network 10'''') includes splicer 300, that combines the functionalities disclosed in relation to splicers 300' and 300'', wherein its subcomponents combine the functionalities of the one or more respective subcomponents of those splicers (for example, output interface 340 can perform the functions of output interface 340' and of 340'', and out-of-band-transmitter 350 can perform the functions of out-of-band-transmitter 350'').

Different media streams that include both first and second access units (such as media streams 103, 104 and 105, that may be second media stream 102 as discussed above) may be treated differently—e.g. according to any of the techniques discussed above. For example, media stream 103 may be processed by splicer 300 in response to decoding-information received from media stream monitor 230, while media stream 104 may be processed by media preprocessing unit 215 of head-end 200.

The considerations for treating different such media streams in different ways are various, and only few examples will be provided. It is noted that the decision which may media streams will be treated according to which of the different techniques may be taken by different entities in different embodiments of the invention—and possibly by more than one entity. Such entities may be, for example in cable systems, the head-end, the advertisements manager, the splicer, and so forth.

For example, the media preprocessing unit 215 may choose to process only some of the media streams, and the splicer—if detecting that the splicing event first access unit does not include sufficient decoding parameters (this will not happen if preprocessed by media processing unit 215) may check if monitoring information from monitor 230 is available for the respective media stream. If the monitoring information was received, it may process the media stream in response to it, while if it wasn't it may send a proper instruction to STB 400 by out-of-band-transmitter 350.

Some of the considerations that may be made by the one or more entities deciding which media streams to process and how may be, by way of example—available computing resources, availability of computing resources of another entity (e.g. the head-end taking into account splicer available computing resources and/or capabilities) number of viewers for that media stream, complexity of processing, frequency of first access units in the media stream, type of intermediary units 400 that participates in the transmission of the media stream to the remote unit, and so forth.

Likewise, various combinations of methods 600, 700 and 800 may be made, according to which various stages selected from any two or more of those methods may be implemented. Such embodiments of the invention would usually include at least one additional stage of selecting which technique to apply for each media streams, wherein different techniques are applied to different media streams. According to various embodiments of the invention, methods that implement all the possible combinations may be used. Conveniently, a single media stream is processed (or otherwise handle) only according to one of the techniques relations to methods 600, 700, or 800, but this is not necessarily so. Furthermore, the success of handling a media stream according to one technique may affect a decision of whether to handle it with other techniques as well. For example, if a given second media stream was attempted to be processed in response to decoding-information received from a media stream monitor as disclosed in relation to method 700, and this decoding-information was insufficient, or erroneous, the media stream may still be handled as disclosed in relation to method 800, and a proper OOB instruction may be sent to the remote unit.

It is should be noted that in various embodiments of the invention, for all the methods and the system disclosed above, embodiments exists that support splicing over:

i. Encrypted and clear streams.
 ii. Programs with multiple audio PIDs.

The herein disclosed methods and systems introduce techniques that may be used, inter alia, to perform legal splicing over advanced audio stream formats where parameters are specified in optional headers.

The herein disclosed methods and systems introduce techniques that may be used, inter alia, for splicing over AAC-V1 and AAC-V2 audio streams of all profiles and specifically with AAC-HE (without limiting the invention to those standards).

The herein disclosed methods and systems may be used, inter alia, for splicing over multimedia streams carrying multiple audio streams.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A media processing unit, the media processing unit comprising:
   an input interface, configured to receive a second media stream, wherein the second media stream comprises first access units each comprising a first plurality of multiple contiguous frames and second access units each comprising a second plurality of multiple contiguous frames; wherein packet headers for the second access units lacks decoding parameters sufficient for full decoding of the second access units; wherein each first access unit comprises decoding parameters included in associated packet headers required for full decoding of at least one first access unit and of at least one second access unit;
   a media-processor, configured to select a selected access unit of the second media stream, and to process the second media stream to provide a processed second media stream by writing into the selected access unit decoding parameters that are responsive to decoding parameters of a previous first access unit; and
   a transmitter, configured to transmit the processed second media stream to a splicer.

2. The media processing unit of claim 1, wherein the media-processor is further configured to determine whether sufficient decoding parameters are comprised in the selected access unit, and to selectively write the decoding parameters in response to a result of the determining.

3. The media processing unit of claim 1, wherein the media processing unit is coupled to a splicer that is configured to splice the processed second media stream after a first media stream, wherein the splicing is carried out in the selected access unit.

4. The media processing unit of claim 1, wherein the media-processor is configured to select multiple access points of the second media stream, and to process the second media stream by at least writing into the different selected access units of the second media stream different decoding parameters responsive to the decoding parameters of at least one first access unit.

5. The media processing unit of claim 1, wherein the media-processor is configured to select the access unit in response to a future timing of a splicing event.

6. The media processing unit of claim 1, wherein the second media stream comprises multiple elementary streams, wherein the media-processor is configured to select different access units that are not aligned with each other for each of the multiple elementary streams, and to process the multiple elementary streams in response to the multiple different access units selected.

7. A method for media transmission, the method comprising:
   receiving a second media stream for splicing into a first media stream, the first and second media streams being independent of one another, wherein the second media stream comprises first access units and second access units; wherein each second access unit lacks decoding parameters sufficient for full decoding of the second access unit; wherein each first access unit comprises decoding parameters required for full decoding of at least one first access unit and of at least one second access unit;
   selecting an access unit of the second media stream;
   processing the second media stream to provide a processed second media stream, wherein the processing comprises writing into the selected access unit decoding parameters that are responsive to the decoding parameters of a previous first access unit; and
   transmitting the processed second media stream to a splicer.

8. The method of claim 7, further comprising determining whether sufficient decoding parameters are comprised in the selected access unit, wherein the writing is selectively carried out in response to a result of the determining.

9. The method of claim 7, further comprising splicing, by the splicer, the processed second media stream after the first media stream, wherein the splicing is carried out in the selected access unit.

10. The method of claim 7, wherein the selecting comprises selecting multiple access points of the second media stream, wherein the processing comprises writing into the different selected access units of the second media stream different decoding parameters responsive to the decoding parameters of at least one first access unit.

11. The method of claim 7, wherein the selecting comprises selecting the access unit in response to a future timing of a splicing event.

12. The method of claim 7, wherein the transmitting comprises transmitting over a network connection, by a unit that carries out the processing and which is incapable of splicing, the processed second media stream to the splicer that is a remote splicer located in a different geographical location.

13. The method of claim 7, wherein the receiving comprises receiving the second media stream that comprises multiple elementary streams, wherein the selecting comprises selecting different access units that are not aligned with each other for each of the multiple elementary streams.

14. A splicer, comprising:
   an output interface, configured to transmit media streams to another unit;
   a media-stream input interface, configured to receive a second media stream for splicing into a first media stream, the first media stream being independent of the second media stream, wherein the second media stream comprises first access units and second access units; wherein each second access unit lacks decoding parameters sufficient for full decoding of the second access unit; wherein each first access unit comprises decoding parameters required for full decoding of at least one first access unit and of at least one second access unit; and
   a processor configured to process the second media stream to provide a processed second media stream in response to decoding-information that pertains to decoding parameters of at least one access unit of the second media stream and that is received from a media-stream monitor that monitors the second media stream;
   wherein the splicer is configured to splice the transmission of the output interface from transmission of a first media stream into transmission to the other unit of the processed second media stream.

15. The splicer according to claim 14, wherein the processor is configured to process the second media stream by at least writing into a selected access unit decoding parameters that are responsive to decoding-information that pertains to decoding parameters of at least one access unit of the second media stream and that is received from a media-stream monitor that monitors the second media stream.

16. The splicer according to claim 14, wherein the media-stream input interface receives the second media stream starting at an initiatory access unit of the second media stream, wherein the splicer further includes a decoding information input interface that is configured to receive, from media-stream monitor, the decoding-information that includes information pertaining to the at least one first access unit that is earlier than the initiatory access unit.

17. The splicer according to claim 14, wherein the processor is further configured to insert a new mute frame into the second media stream, wherein the new mute frame comprises a decoding parameters header that comprises decoding parameters that are responsive to the decoding-information received from the media-stream monitor.

18. A method for media transmission, the method comprising carrying out by a splicer:
- transmitting a first media stream to another unit;
- receiving a second media stream, wherein the second media stream comprises first access units each comprising a first plurality of multiple contiguous frames and second access units each comprising a second plurality of multiple contiguous frames; wherein packet headers for the second access units lacks decoding parameters sufficient for full decoding of the second access units; wherein each first access unit comprises decoding parameters included in associated packet headers required for full decoding of at least one first access unit and of at least one second access unit;
- processing the second media stream to provide a processed second media stream, wherein the processing comprises writing into a selected access unit of the second media stream decoding parameters that are responsive to decoding-information that pertains to decoding parameters of at least one access unit of the second media stream and that is received from a media-stream monitor that monitors the second media stream; and
- splicing the processed second media stream into the first media stream being transmitted to the other unit.

19. The method according claim 18, wherein the receiving comprises receiving a second media stream starting at an initiatory access unit of the second media stream; wherein the method further comprises receiving, from a media-stream monitor, the decoding-information that comprises information pertaining to the at least one first access unit that is earlier than the initiatory access unit.

20. The method according claim 18, wherein the processing further comprises inserting a new mute frame into the second media stream, wherein the new mute frame comprises a decoding parameters header that comprises decoding parameters that are responsive to the decoding-information received from the media-stream monitor.

21. A splicer, comprising:
- an output interface, configured to transmit media stream to another unit; and
- a media-stream input interface, configured to receive a second media stream for splicing into a first media stream, the first media stream being independent of the second media stream, wherein the second media stream comprises first access units and second access units; wherein each second access unit lacks decoding parameters sufficient for full decoding of the second access unit; wherein each first access unit comprises decoding parameters required for full decoding of at least one first access unit and of at least one second access unit;
- wherein the splicer is configured to splice the transmission of the output interface from transmission of a first media stream into transmission to the other unit of the second media stream;
- wherein the output interface is further configured to: (a) transmit the second media stream at a first quality from a timing of the splicing until a quality enhancing moment, and (b) transmit the second media stream at a higher quality that is higher than the first quality after the quality enhancing moment.

22. The splicer according to claim 21, wherein the output interface is configured to transmit the second media stream at the first quality by transmitting a portion of the second media stream without access units that comprise decoding parameters required for full decoding of first access units and of second access units, and to transmit the second media stream at the higher quality by transmitting a portion of the second media stream with at least one access unit that comprises decoding parameters required for full decoding of first access units and of second access units.

23. The splicer according to claim 21, wherein the splicer further comprises an out-of-band-transmitter, configured to transmit to the other unit over an out-of-band channel other than the channel used for the transmission of the second media stream an instruction to play the second media stream at the first quality as long as decoding parameters required for full decoding of first and second access units are not up-to-date.

24. The splicer according to claim 21, further comprising a processor operable to write new decoding parameters into the second media stream, wherein the output interface is operable to transmit the second media stream at the first quality by starting a transmission of the second media stream with an access unit of the second media stream that comprises the new decoding parameters.

25. A method for media transmission, the method comprising:
- transmitting a first media stream to another unit;
- receiving a second media stream for splicing into a first media stream, the first and second media streams being independent of one another, wherein the second media stream comprises first access units and second access units; wherein each second access unit lacks decoding parameters sufficient for full decoding of the second access unit; wherein each first access unit comprises decoding parameters required for full decoding of at least one first access unit and of at least one second access unit; and
- splicing the second media stream into the first media stream transmitted to the other unit; wherein the splicing of the second media stream comprises: (a) transmitting the second media stream at a first quality from a timing of the splicing until a quality enhancing moment, and (b) transmitting the second media stream at a higher quality that is higher than the first quality after the quality enhancing moment.

26. The method according to claim 25, wherein the transmitting at the first quality comprises transmitting a portion of the second media stream without access units that comprise decoding parameters required for full decoding of first access units and of second access units; wherein the transmitting at the higher quality comprises transmitting a portion of the second media stream with at least one access unit that comprises decoding parameters required for full decoding of first access units and of second access units.

27. The method according to claim 25, further comprising transmitting to the other unit over an out-of-band channel other than the channel used for the transmission of the second media stream an instruction to play the second media stream at the first quality as long as decoding parameters required for full decoding of first and second access units are not up-to-date.

28. The method according to claim 25, further comprising writing into the second media-stream new decoding parameters, wherein the transmitting at the first quality starts at transmitting an access unit the comprises the new decoding parameters.

* * * * *